July 10, 1962 N. S. ANDERSON ETAL 3,043,515
SIGNAL ANALYZING APPARATUS
Filed Oct. 7, 1957 3 Sheets-Sheet 2

Neal S. Anderson
Julius S. Bendat
Cecil E. Williams
INVENTORS

BY Frederick M Arbuckle,
agent
Morris Spector,
ATTORNEY

July 10, 1962  N. S. ANDERSON ETAL  3,043,515
SIGNAL ANALYZING APPARATUS
Filed Oct. 7, 1957  3 Sheets-Sheet 3

Neal S. Anderson
Julius S. Bendat
Cecil E. Williams
INVENTORS

BY
ATTORNEY

3,043,515
SIGNAL ANALYZING APPARATUS

Neal S. Anderson, Rolling Hills, Julius S. Bendat, Los Angeles, and Cecil E. Williams, Hawthorne, Calif., assignors, by mesne assignments, to Thompson Ramo Wooldridge Inc., Cleveland, Ohio, a corporation of Ohio Filed Oct. 7, 1957, Ser. No. 688,468
18 Claims. (Cl. 235—181)

The present invention relates to improvements in apparatus and methods for examining electrical signal data, and more particularly in apparatus and methods for determining the value of a variable parameter of a mathematical function at which an expected variation in the mathematical function occurs.

In more particularity, the present invention provides improved apparatus and techniques for examining auto-correlation data obtained from the auto-correlation of electrical signals over a plurality of discrete stepped auto-correlation delays to determine that value of auto-correlation delay yielding precise correlation between the electrical signals.

The present invention further involves improvements in electrical commutation devices and systems whereby high-speed commutation of a plurality of electrical datum potentials may be carried out in a given total commutation interval and in a manner permitting positive identification of each commutated datum potential at any time during said given total commutation interval.

In many electrical systems involving the presentation of mathematical information in the form of electrical datum signals, it is desirable to provide rapid-acting means for analyzing these datum potentials with a view to determining either the form of the mathematical function expressed by the datum potentials and/or examining the nature of such a mathematical function for the purpose of detecting predetermined variations therein and associating such variations with discrete values of a variable. In the prior art, such techniques have been carried out through the use of complex and expensive electronic computer systems which analyze stored electrical data on a commutative basis. That is, a plurality of signal data, which taken together represent information to be analyzed, is stored by memory devices and means provided for interrogating these memory devices through some form of electrical commutation action which applies the interrogated information to an electronic computer or other logical system.

A typical example of systems in which such electrical signal analysis is desirable is found in the carrying out of signal correlation techniques. The mathematical significance of signal correlation is described in an unclassified technical report No. 144 by Cruft Laboratory, Harvard University, Cambridge, Mass., and entitled "An Analog Computer for Correlation Functions in Communication Systems," by R. A. Johnson, dated March 25, 1952.

The derivation of the auto-correlation and cross-correlation functions of time dependent signals is of primary importance in the field of the statistical theory of communications. Briefly, in order to derive an auto-correlation function of a signal, the signal is applied to means which introduces a series of delays into the signal and the original signal is multiplied by these delayed versions. If "$n$" delay values are employed in carrying out the correlation, there will be involved "$n$" electrical multipliers each of which is applied to a separate integrator and there averaged. Devices for producing auto-correlation functions of given time functions are well known in the art and in one such device a multi-section tapped delay line is used whose input feeds one input lead of each of a group of electrical multipliers, each tap on the delay line being connected to the other input lead of a different one of the multipliers. It is of general interest in such systems to determine what value of correlation delay produces the maximum value of the auto-correlation function. This value of delay, when determined, can be employed to determine statistical information about one or more correlated signals which, in some communication systems, may relate to such quantities as distance, velocity, amplitude probability. Where such auto-correlation data is produced by "$n$" correlation channels operating upon a signal having relative short duration, it is often important to provide means for completely analyzing the correlation data in a time interval comparable to or less than the duration of the signals themselves.

It is, therefore, an object of the present invention to provide improved apparatus for rapidly examining signal data.

It is a further object of the present invention to provide novel apparatus for electrically analyzing a mathematical function $f(x)$ for determining the value of the variable $x$ at which an expected variation in the mathematical function occurs.

It is a further object of the present invention to provide an improved electrical signal commutation system wherein high-speed commutation of a plurality of electrical signals may be accomplished within a given total commutation time with knowledge being maintained at any time during the total commutation interval of the identity of the signal being commutated.

It is a further object of the present invention to provide an improved apparatus for assisting in carrying out signal correlation analysis wherein two electrical signals are correlated with respect to one another on an elemental delay basis to develop a plurality of datum potentials representing a correlation curve, the correlation delay interval corresponding to the peak of this curve being identified by an indicating signal generated through the commutative sampling of the developed datum potentials.

In carrying out the present invention, there is provided a high-speed commutating apparatus capable of commutating, sampling, or sensing a plurality of electrical datum potentials representing desired information depictable in the form of a mathematical curve. During the commutation cycle, the datum potentials are simultaneously sampled by two separate means time displaced but locked to one another throughout the entire commutation cycle. The resulting commutation signals, substantially identical in form but phase displaced with respect to one another, are continuously compared with one another throughout the commutation cycle to produce an alternating current waveform. The associated zero crossing behavior of this waveform, about its axis, indicates the presence of a predetermined variation in the mathematical curve by which the datum potentials may be depicted. Means are then provided for developing an indicating signal representing the zero crossing, the time occurrence of which may be directly employed to identify a particular datum potential in the range of the detected predetermined variation.

In maintaining knowledge of the commutation action at any instant during the commutation time, the present invention in one form employs means for sensing and measuring the phase of the commutation cycle at any instant during its progression, such means, in one form of the invention, comprising a resettable time lapse measuring device which is actuated and reset at, respectively, the beginning and ending of the commutation cycle; with means for interrogating, at any instant during the commutation cycle, the time lapse measuring device to determine the phase of the commutation cycle at the instant of interrogation.

In a preferred form of the present invention, interrogation of the time lapse measurement means above described is accomplished by the indicating signal resulting from the continuous comparison of the two commutation signals above described.

In the systems where the data presented for analysis contains unwanted contamination, such as noise components, the present invention provides means for carrying out the above analysis on the basis of continuously averaging groups of data throughout the analysis interval.

It is, therefore, another object of the present invention to provide novel means for analyzing electrical signal data in a manner reducing the effects of certain data contamination attributable to the presence of unwanted noise components.

A more thorough understanding of the present invention, both as to its mode of operation and its many features and advantages, will be obtained through a reading of the following description taken in combination with the accompanying drawings, in which.

Figure 1:
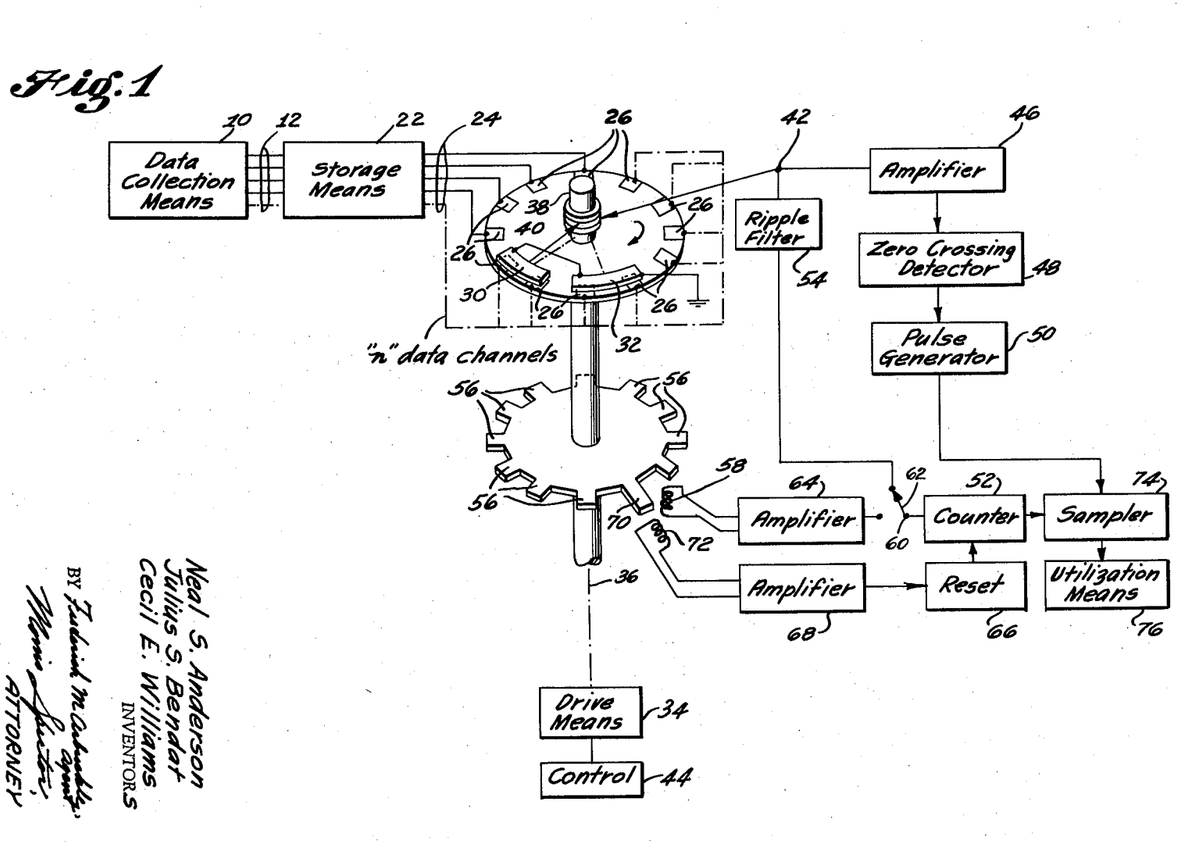
FIGURE 1 is a combination block and diagrammatic representation of one form of signal analysis apparatus provided by the present invention.

Turning now to FIGURE 1, there is indicated by the block 10 means for collecting data and producing electrical signals representing such data at a plurality of output terminals 12. The output terminals 12 are indicated as being "n" in number. Such electrical data as may be produced by the collection means 10 may represent a variety of informations, such as, for example, data depicting the values of an auto-correlation function for various respective values of discrete correlation delays. Such data may be generated by the well-known arrangement shown in FIGURE 2 wherein a signal A from source 14 is correlated with a signal B provided by source 16. The correlation is carried out by means of "n" correlators indicated at 17, each effectively multiplying the signal A by the signal B for different values of correlation delay provided by the tapped delay line 18. Each of the "n" correlators at 17 includes integration or averaging means which averages the product of multiplication over a finite time interval so as to develop at the "n" output terminals 20 a plurality of datum potentials representing the various values of the correlation function for discrete elemental changes in the correlation delay time interval provided by the tapped line 18.

It is understood that, for the purposes of the present invention, the datum potentials collected and presented by means 10 in FIGURE 1 may also represent the value of any mathematical function $f(x)$ for various values of the determinant variable $x$. These values may represent progressive unequal changes in the variable or may represent equi-spaced changes or variations in the variable. Further, the values of the variable may represent progressive changes in one or both of two directions, i.e., an increase or decrease, over a given range of values. In the case where the datum potentials available at terminals 12 constitute information of the general character produced by the correlation apparatus of FIGURE 2, these data will be available at terminals 12 on a substantially simultaneous basis and will be sustained or presented at these terminals for but a nominal time interval. If the nominal interval during which the datum potentials are thus made available is relatively short compared to the time allotted for their analysis as hereinafter described, a signal storage means 22 may advantageously be employed. The storage means 22 merely maintains at the storage output terminals 24 electrical signals representing the data provided by means 10, for a time interval sufficiently long to permit their analysis. If, on the other hand, the interval during which a given set of datum potentials is produced at terminals 12 is relatively long compared to the time allotted for their analysis, the storage means 22 may be eliminated.

In accordance with the present invention, a plurality of signal presentation means 26 are provided, equal in number to the "n" datum potentials presented by means 10. Each signal presentation means 26 is of a character permitting it to be sampled or sensed to derive an electrical signal representing the magnitude of the datum potential applied to each. The presentation means 26 may, therefore, be electromagnetic, electrostatic, optical, conductive mechanical contacts or equivalents, for the purpose hereinafter described. To this end, sensing means cooperating with the presentation means comprises, in one form of the invention, two separate sensing elements 30 and 32. The sensing means is driven by a driving means 34 in successive sequential sampling or commutative relationship to the signal presentation means 26. One convenient way of accomplishing this is illustrated in FIGURE 1 and constitutes the arrangement of the signal presentation means 26 around a circular path with the sensing means driven in a corresponding circular path from a center of rotation 36 corresponding with the axis of shaft 38. Electsical output signals sensed by the sensing means are carried off during rotation of the shaft 38 by means of a slip ring and brush arrangement indicated at 40. The output terminal 42 will, during the action of driving means 34, present an electrical signal corresponding to the sequential sampling, sensing or commutation of electrical data applied to the presentation means 26. The driving means 34 may, if desired, be conveniently actuated through a control means 44 in response to certain aspects of electrical signals delivered by the data collection and presentation means 10.

During the total sampling interval in which all of the data is sensed or sampled, such total sampling interval corresponding to one rotation of the shaft 38, the present invention provides for the development of what amounts to two separate sampling signals. Specifically, the sensing elements 30 and 32 each sample all of the data presented but do so on a time displaced basis. By interconnecting the sensing elements 30 and 32 or otherwise producing a continuous comparison between the information sensed by each during the sampling time interval, the sampling output signal presented at output terminal 42 can be made to represent the occurrence of predetermined aspects of a mathematical curve depicting the data sampled. As will become more apparent hereinafter, the sampling output signal at terminal 42 may, therefore, be amplified by amplifier 46 and applied to means including detector 48 which senses the occurrence of predetermined variations in the sampling output signal and actuates a pulse generator 50.

In order to provide some positive identification of the particular data being read, sensed, commutated or sampled, and presented at the output terminal 42 at the time of detecting the predetermined variation of interest, the present invention provides means for generating electrical signals, the characteristics of which continuously change in a predetermined manner as a function of the phase of the sampling action at progressive times throughout the total sampling interval. Such means may take a variety of forms and in the arrangement of FIGURE 1 comprises a time lapse measurement system embodying a counter 52 which is actuated during the sampling interval in accordance with the individual occurrences of data sampling throughout the sampling interval. To accomplish this, the counter 52 may be made responsive to the ripple component of the output signal available at the output terminal 42 and selected by filter 54. On the other hand, the counter may be made responsive to an electrical signal generated by means such as the toothed tone wheel 56 acting in cooperation with an electromagnetic pickup coil 58. The counter 52 is provided with an input terminal 60 which, by means of a switch 62, may be connected to either the output of the ripple filter 54 or the output of an amplifier 64 which amplifies signals induced in pickup coil 58 as the toothed wheel 56 is caused to rotate. If the counter 52 is not of the self-resetting variety, it is convenient to provide means for resetting the counter at the end of each sampling interval. This may also be accomplished in a variety of ways such as the counter reset means 66 responsive to the output of amplifier 68 to reset the counter whenever a reset tooth 70, on tone wheel 56, passes the reset pickup coil 72. The counter 52 may, therefore, be interrogated at any time during the total sampling interval to yield information as to which of the datum presentation means 26 is being sampled at the time of interrogation.

In accordance with the present invention, means are provided for effectively interrogating the counter 52 at the time the expected variation in data occurs. This is accomplished by actuating a sampler 74 in response to the pulse delivered by the pulse generator 50 and applying the sampled counter information to some form of utilization means 76. Utilization means 76 may be of a form giving a visual presentation of the state of the counter 52 at the time it is sampled or interrogated, or utilization means 76 may conveniently provide electrical data the magnitude of which digitally identifies the particular data being sampled at the time of interrogation. By equating or assigning values of elemental change in the variable producing the information at the output terminals 12 of the data collection means to certain values of digital information provided by interrogation of the counter 52, it is possible to usefully determine and identify the particular range of values in the variable which produces a given detected variation in the data analyzed.

An understanding of the general utility of the present invention will perhaps be best gained by a consideration of a practical problem involving the analysis of electrical signal correlation information. By this analysis it will be seen how continuous comparison of two phase displaced versions of electrical data sensed during a given total sampling time interval may be employed to detect predetermined aspects of the data examined. Consider the nature of the correlation data available at terminals 20 in FIGURE 2. As pointed out above, these potentials will vary in magnitude as a function of a variable known as correlation delay time. The elemental changes in the correlation delay time are, of course, provided by means such as the tapped delay line 18 previously described. The resulting information at terminals 20 may then, therefore, be graphically plotted as in FIGURE 3 to yield a curve 78 representing different magnitudes of correlation function values $V_c$ (plotted along the ordinate 80) for discrete values $d_1, d_2, d_3 \ldots d_n$ of correlation delays. If the signal sources A and B represent substantially the same mathematical function displaced with respect to itself and it is desired to determine the magnitude of this delay by which the signals A and B are displaced, correlation techniques will yield such information by examining the correlation function 78 to determine that value of correlation delay producing the maximum value of correlation function. This maximum value or peak in the correlation curve shown at 82 in FIGURE 3 corresponds to a value $d_x$. The value of delay, $d_x$, will agree with the actual delay difference between the signals provided by sources A and B, FIGURE 2. It is, therefore, of value to analyze the data provided by terminals 20 in FIGURE 2 to determine the value of correlation delay at which the peak 82 in the correlation curve 78 occurs.

Figure 2:
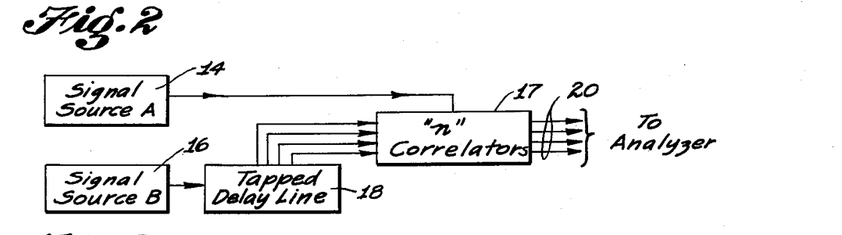
FIGURE 2 is a block diagram representation of a conventional signal correlation datum signal developing means providing signal data capable of analysis by the apparatus of FIGURE 1.

In accordance with the present invention, the determination of the correlation delay $d_x$ is accomplished by locating the peak in the correlation curve 78 of FIGURE 2 through the process of commutating or successively sampling the correlation data as presented to the data presentation means 26 in FIGURE 1. Concurrently with the commutation or sampling process, continuous track is kept of the position of the sensing means 28 during the sampling interval so that such knowledge or information may be employed at the time the peak 82 is detected, to develop digital information at the output of the sampler 74 which may be directly equated to digital values of delay employed in the correlation process.

Figure 3:
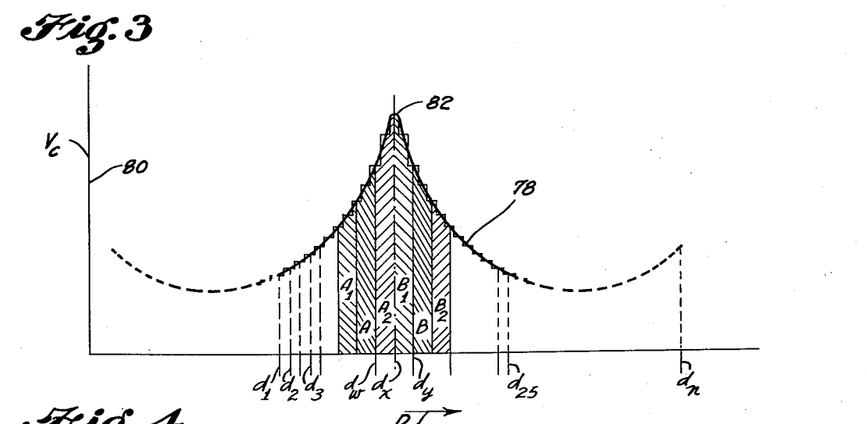
FIGURE 3 is a graphical representation of a typical mathematical curve depicting typical auto-correlation signal information.
Figure 4:
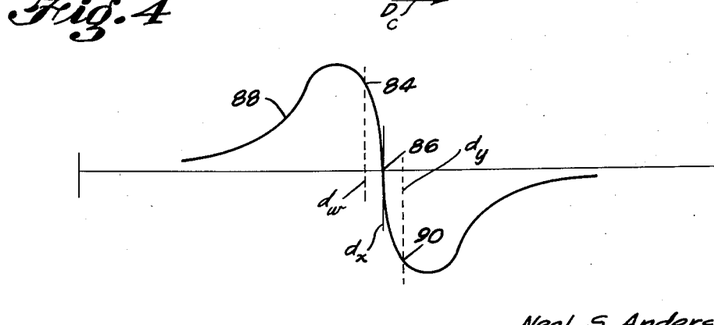
FIGURE 4 is a graphical presentation of the unique form of the indicating signal generated by the apparatus of FIGURE 1, the zero axis crossing of which indicates the occurrence of a peak in the mathematical curve shown in FIGURE 3.

The peak of the correlation curve in FIGURE 3, in accordance with the action of the present invention, is detected by what amounts to continuously comparing the areas A and B in FIGURE 3 under the curve 78. The areas A and B represent the average of predetermined different groups of electrical data presented by the individual data presentation means 26 taken in groups throughout the sampling cycle. This is achieved by the physical displacement of the sensing elements 30 and 32 comprising the sensing means 28 so that sensing element 30 is responsive at any given instant to a different one or group of the data presentation means 26 than sensing element 32. The present invention in one of its forms further provides for arranging each of the sensing elements 30 and 32 to average the data presented by two or more of the data presentation means 26. By comparing or combining the information sensed by each sensing element, for example through subtractive combination of the signals developed by each sensing element, the resulting signal appearing at output terminal 42 will appear as shown at 84 in FIGURE 4. The waveform 84 in FIGURE 4 will, due to the subtractive combination of the average information sensed by elements 30 and 32, be an alternating current waveform whose zero crossing 86 will occur when the average signal sensed by each of the elements 30 and 32 are equal. This will occur in the case of correlation data analysis of the type depicted by the correlation curve 78 having symmetry about its peak 82, when the areas A and B represented in FIGURE 3 are equal. The zero crossing 86 will, therefore, represent a delay $d_x$ midway between the areas A and B and which in practice may be equated to a value of correlation delay falling in the immediate range of those values of correlation delay adjacent the peak 82. The smaller the value of each elemental change in the correlation delay, of course, the greater the precision with which the peak 82 may be determined.

The principle underlying the development of the alternating current waveform 84 as a result of the effective comparison of areas A and B throughout the sampling interval in FIGURE 3 will be immediately apparent if one considers the magnitudes of the signals delivered by the sensing elements A and B throughout various phases of the sampling interval. For example, as pointed out above and as illustrated in FIGURE 3, when areas A and B, respectively corresponding to the averages of different groups of data presented by the presentation means 26, are equal to one another and subtractively combined, the net voltage will be zero. However, if it is considered that signal A is subtracted from signal B, and the voltage from each sensing element represented in FIGURE 4 as being a positive going quantity, when area B is larger than area A the waveform in FIGURE 4 will depict a positive going value. Thus, the effective subtraction of area $A_1$ from area $B_1$, at a value of delay $d_w$ (less than $d_x$), will yield a positive potential illustrated, for example, at point 84 in FIGURE 4 and corresponding to a delay $d_w$ midway between the individual "center delay values" of areas $A_1$ and $B_1$. Likewise, the subtractive comparison on the same basis of areas $A_2$ and $B_2$, at a value of delay $d_y$ (larger than $d_x$), will yield a negative potential depicted by the waveform 84 at point 90 thereon. It will be further appreciated that the data averaging effect provided by this form of the present invention, wherein the sensing elements 30 and 32 provide an average of data at any given instant, will minimize the effects of any unwanted noise components which may be present in the data being analyzed.

Figure 5:
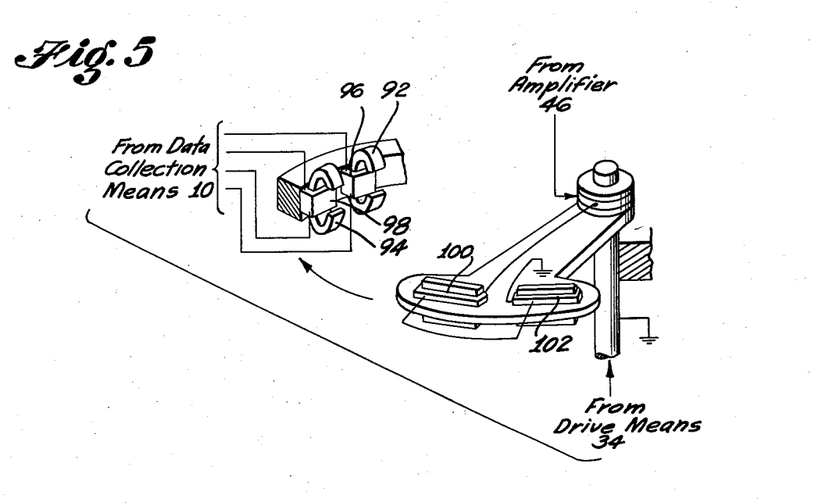
FIGURE 5 is a combination block and diagrammatic representation of a preferred form of signal commutator suitable for use as part of the system shown in FIGURE 1.

One arrangement for providing the high-speed sampling action of the data presentation means 26 by a sensing means 28 is shown, by way of example, in FIGURE 5 of the drawings. Here the data collection means 10 is shown connected in driving relation to a plurality of electromagnetic core structures 92 and 94. For purposes of illustrational simplicity, only two of such cores have been illustrated, it being understood that there would be "$n$" number of such cores, one for each of the "$n$" data provided by the data collection means 10 as in FIGURE 1. Electromagnetic core structures 92 and 94 are preferably each of a type presenting a magnetic flux across an air gap, the intensity of which bears a linear relation to the magnitude of the electrical data signal exciting windings 96 and 98 of the core structures, respectively. In this particular embodiment of the invention, the sensing means may comprise two windings 100 and 102 which are rotationally driven by driving means 34 through the air gaps of the magnetic core structures. Windings 100 and 102 may be subtractively connected within the sensing element 28 so that the signal delivered to the amplifier 46 represents the continuous comparison of data presented by different spaced core structures such as 92 and 94. To achieve the area comparison advantage of the present invention, as discussed in connection with FIGURE 3, each of the windings 100 and 102 may physically comprise a plurality of separate coils having spacings corresponding to the circumferential displacement of the magnetic core structures 92 and 94. The coils comprising each of the sensing element windings 100 and 102 may, on this basis, provide simultaneous samplings of the flux produced by different spaced groups of the "$n$" core structures such as 92 and 94.

Figure 6:
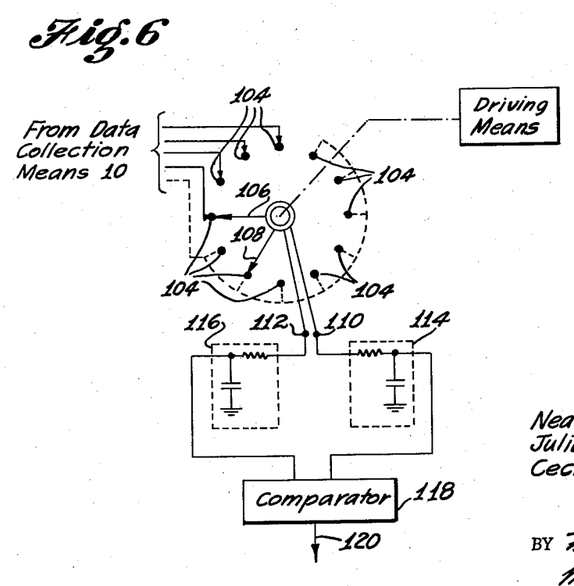
FIGURE 6 shows still another form of signal commutation and indicating signal developing means suitable for use in the arrangement shown in FIGURE 1.

An alternate form of the present invention is shown in FIGURE 6 in which the data collection means 10 directly applies datum potentials to a plurality of "$n$" fixed electrically conductive mechanical contacts 104, also arranged for rotary commutation or sampling. Two rotary commutating arms 106 and 108 are then provided for rotatingly sweeping the contacts 104 during a given commutation interval. The electrical potentials sensed by the arms 106 and 108 as they sweep the contacts 104 are separately brought out to terminals 110 and 112. The arms 106 and 108 bear a fixed spacing relation with respect to one another so that during a commutation cycle the signals appearing at terminals 110 and 112 may appear substantially identical in form but bear a fixed time locked relation or phase displacement relation to one another. If it is desired to eliminate the effects of random noise in the data being analyzed, integrating circuits shown in dotted line areas 114 and 116 may be employed. These may each comprise nothing more than a simple combination of a resistor and capacitor as shown. The time constant of the integrating circuits should be longer than the time taken to commute two successive ones of the contacts 104 if a noise reduction advantage is sought. The signals appearing at the output of the integrating circuits 114 and 116 are then applied to a comparator circuit 118, which may be, for example, a simple signal subtraction circuit, for producing an output signal at terminal 120 having variations, as aforementioned depicting pre-determined characteristics of the data sampled during the commutation interval. In the case where correlation data defined by a curve such as shown in FIGURE 3 of the drawings is presented to the contacts 104, the alternating current waveform appearing at output terminal 120 will appear similar in character to that depicted in FIGURE 4.

It will be understood that the novel data analyzing methods of the present invention are in no way limited to the particular form of commutating, sampling, or sensing device shown and discussed in this specification. High-speed commutation exceeding the capabilities of mechanically actuated systems could, of course, be carried out by optical, electron beam or other low inertia sampling systems of a character automatically suggesting themselves to one skilled in the art after having benefited from the teachings of the present invention. Moreover, although a counter-type time lapse measuring and indicating system has been shown as illustrative of one means for developing a position sense at any time during the commutation cycle, such information can otherwise be developed by measuring circuits synchronously controlled in relation to the action of the comparative sampling means of the present invention.

Having thus described the invention, what is claimed is:

1. Apparatus for analyzing electrical data representing a given mathematical function having a peak value in the range of the data provided, comprising in combination: a source of datum potentials representing the value of said mathematical function for a plurality of discrete values of an independent variable; means for accepting said datum potentials and presenting each to a separate presentation means to permit successive samplings of representations of said datum potential values; a first drivable means operatively associated with all of said presentation means for effectively sensing all of the values of said datum potential representations each on a successive basis to deliver at a first output terminal a first sampling signal, said sensing means having a starting reference corresponding to a first given value of said variable; a second drivable means operatively associated with all of said presentation means for likewise effectively sensing all the values of said datum potential representations each on a successive basis to deliver at a second output terminal a second sampling signal, said second sensing means having a starting reference corresponding to a second given value of said variable displaced from and different in value than said first given value of said variable so that said first and second sensing means effectively bracket at least one datum presentation means; means operatively and simultaneously driving said first and second sensing means in mutually time locked relationship in their sequential sensing of all of said datum potential representations within a given total sensing interval so that said first and second sampling signals bear a time locked relation to one another; and means connected with said first and second output terminals for subtractively combining said sampling signals appearing at said first and second output terminals to develop an alternating current waveform, a zero crossing of which about its axis substantially agreeing in time occurrence to a peak in said mathematical function as sensed by said sensing means during said total sensing interval.

2. Apparatus for analyzing electrical data representing a given mathematical function having a peak value in the range of the data provided, comprising in combination: a source of datum potentials representing the value of said mathematical function for a plurality of discrete values of an independent variable; means for accepting said datum potentials and presenting each to a separate sampling terminal means to permit successive commutative samplings of said datum potentials; a first means operatively associated with said sampling terminals for effectively commutating all of the values of said datum potentials on a successive basis to a first output terminal, said commutating means having a starting reference corresponding to a first given value of said variable; second means operatively associated with said sampling terminals for likewise effectively commutating the values of said datum information to a second output terminal, said second commutating means having a starting reference corresponding to a second given value of said variable displaced and different from said first given value so that said first and second commutating means effectively bracket at least one datum potential value; means operatively driving said first and second commutating means in mutually time locked relationship in simultaneous commutation of said datum potentials within a given total commutation time to develop first and second time displaced commutation signals at said first and second output terminals; and means connected with said first and second output terminals for subtractively combining the commutation signals appearing at said first and second output terminals to deliver an alternating current waveform, a zero crossing of which about its axis substantially corresponding in time occurrence to a peak in said mathematical function as analyzed by said commutation means.

3. Apparatus for determining an expected peak in a mathematical function such as $f(x)$ where said function is suspected to have substantial symmetry in the immediate range of that value of the variable $x$ at which said peak is expected to occur, said apparatus being designated for use in conjunction with a signal source providing a plurality of discrete datum potentials, each of said datum potentials representing the value of said function for a different discrete stepped value of the variable $x$, said apparatus comprising: first means for successively sampling all of said datum potentials at a constant rate in a sequence corresponding to a given stepped change in the variable $x$ to present an output signal whose waveform resembles the character of said mathematical function; second means for successively sampling all of said datum potentials at the same rate as said first means and in the same sequence of change in the variable $x$, but displaced in its sampling action from said first sampling means by at least one discrete value of the variable $x$ to produce a second output signal having a waveform substantially the same as said first output signal but effectively displaced in phase therefrom; means for integrating said first output signal with an effective time constant of integration greater than the time required to sample at least one of said datum potentials; means for integrating said second output signal with an effective time constant of integration greater than the time required to sample at least one of said datum potentials; means for subtractively combining said first and second integrated potentials to develop an alternating current indicator signal whose zero crossing about its axis bears a fixed timing relation to the occurrence of said expected peak in said mathematical function as represented by said datum potential during the sampling action of said sampling means; means connected with the output of said subtractive combining means and responsive to the zero crossing of said alternating current waveform to develop an actuating signal occurring in time agreement with said zero crossing; means operatively coupled to said sampling means for developing a reference signal which changes in value in a given direction by a given amount during commutation of all of said datum potentials; and means responsive to said actuating signal for sampling said developed reference signal upon the occurrence of said actuating signal whereby said sampled value of said reference signal substantially represents a discrete value of the variable $x$ productive of said expected peak.

4. Apparatus for determining an expected peak in a mathematical function such as $f(x)$ where said function is suspected to have substantial symmetry in the immediate range of that value of the variable $x$ at which said peak is expected to occur, said apparatus being designated for use in conjunction with a signal source providing a plurality of discrete datum potentials, each of said datum potentials representing the value of said function for a different discrete stepped value of the variable $x$, said apparatus comprising: first means for successively sampling all of said datum potentials at a constant rate in a sequence corresponding to a given stepped change in the variable $x$ to present an output signal whose waveform resembles the character of said mathematical function; second means acting jointly with said first means for sampling all of said datum potentials at the same rate as said first means and in the same sequence of change in the variable $x$, but displaced in its sampling action from said first sampling means by at least one discrete value of the variable $x$ to produce a second output signal having a waveform substantially the same as said first output signal but effectively displaced in phase therefrom; means for integrating said first output signal with an effective time constant of integration greater than the time required to sample at least one of said datum potentials; means for integrating said second output signal with an effective time constant of integration greater than the time required to sample at least one of said datum potentials; and means for simultaneously comparing said first and second integrated potentials to develop an indicator signal which bears a fixed timing relation to the approximate occurrence of said expected peak in said mathematical function as represented by said datum potential during the joint sampling action of said sampling means.

5. Apparatus for determining an expected peak in a mathematical function such as $f(x)$ where said function is suspected to have substantial symmetry in the immediate range of that value of the variable $x$ at which said peak is expected to occur, said apparatus being designated for use in conjunction with a signal source providing a plurality of discrete datum potentials, each of said datum potentials representing the value of said function for a different discrete stepped value of the variable $x$, said apparatus comprising: first means for successively sampling all of said datum potentials at a constant rate in a sequence corresponding to a given stepped change in the variable $x$ to present an output signal whose waveform resembles the character of said mathematical function; second means for sampling all of said datum potentials at the same rate as provided by said first means and in the same sequence of change in the variable $x$, but displaced in its sampling action from said first sampling means by at least one discrete value of the variable $x$ to produce a second output signal having a waveform substantially the same as said first output signal but effectively displaced in phase therefrom; means for integrating said first output signal with an effective time constant of integration greater than the time required to sample at least one of said datum potentials; means for integrating said second output signal with an effective time constant of integration greater than the time required to sample at least one of said datum potentials; and means for subtractively combining said first and second integrated potentials to develop an alternating current indicator signal whose zero crossing about its axis bears a fixed timing relation to the occurrence of said expected peak in said mathematical function as represented by said datum potential during the sampling action of said sampling means.

6. Apparatus for examining a mathematical function $f(x)$, comprising in combination: data collection and presentation means for supplying to a plurality of output means datum signals representing the values of said function for successive changes in the variable $x$, said datum signals being inherently contaminated with unwanted noise signal components; first means for sequentially sampling all of said output means on a grouped basis so that the sampling information provided by said first sampling means comprises a continuously changing average of data presented by more than one of said output means; second means for sequentially sampling all of said output means on a grouped basis so that the sampling information provided by said sampling means comprises another continuously changing average of data presented by more than one of said output means; means for simultaneously actuating said first and second sampling means in time locked relationship to one another, but displaced from one another such that in any given instant the group of output means sampled by said first sampling means is separated from the group of output means sampled by said second sampling means; and means for combining the outputs of said first and second sampling means to yield a comparison signal depicting a desired aspect of said mathematical function independently of said unwanted contamination by noise signal components.

7. Apparatus for examining electrical signal data depicting a mathematical function $f(x)$ to determine a desired characteristic thereof irrespective of the presence of unwanted noise contamination, comprising in combination: data collection and presentation means for supplying to a plurality of output means datum signals representing the values of said function for successive equispaced elemental changes in the variable $x$, said datum signals being inherently contaminated with unwanted noise signal components; first means for sequentially sampling all of said output means during a given total sampling period on a group basis so that the sampling information provided by said first sampling means comprises, during said sampling period, a continuously changing average of data presented by also continuously changing groups of said output means, each group being comprised of a given number of output means; second means for sequentially sampling all of said output means during a given total sampling period on a grouped basis so that the sampling information provided by said sampling means comprises, during said sampling period, another continuously changing average of data presented by also continuously changing groups of said output means, each group being comprised in number of said same given number of output means; means for simultaneously actuating said first and second sampling means in time locked relationship to one another during said sampling period, but displaced from one another such that in any given instant in said sampling period the group of output means sampled by said first sampling means is effectively separated from the group of output means sampled by said second sampling means by at least one output means; and means for comparing the outputs of said first and second sampling means during said sampling period to yield a comparison signal depicting a said desired characteristic of said mathematical function independently of said unwanted noise contamination.

8. Apparatus for examining a mathematical function $f(x)$ for determining the value of the variable $x$ at which an expected peak in the mathematical function occurs, said expected peak occurring at a point of substantial symmetry in said mathematical function, the combination of: data collection and presentation means for providing at a plurality of output terminals, datum potentials representing the values of said function for successive equispaced increments in the variable $x$; means for successively sampling all of said datum potentials on a linear time basis within a given sampling time interval commencing with a datum potential corresponding to a reference value of the variable $x$; second means for successively sampling all of said datum potentials on a linear time basis within the same sampling time interval commencing with a datum potential corresponding to a second reference value of the variable $x$ different from said first given value and displaced from said first given value by more than one increment in value of the variable $x$; means for subtractively combining the electrical information derived from said first and second sampling means for developing an alternating current waveform signal having a zero crossing about its axis corresponding to a peak in said mathematical function; means responsive to said alternating current waveform signal for developing an indicating signal in response to the occurrence of the zero crossing in said subtractively produced waveform; counter means responsive to the beginning of said sampling cycle to commence a counting cycle; means for re-setting said counter to a reference condition at the termination of said sampling interval; and means responsive to said indicating signal for effectively reading said counter at the time said peak occurs whereby the reading of said counter bears a known relation to the value of the variable $x$ at which said expected peak occurs.

9. Apparatus for examining a mathematical function such as $f(x)$ for determining the value of the variable $x$ at which an expected variation in the mathematical function occurs, the combination of: data collection and presentation means for providing at a plurality of output terminals, datum potentials representing the values of said function for successive elemental changes in the variable $x$; means for successively sampling all of said datum potentials on a linear time basis commencing with a datum potential corresponding to a reference value of the variable $x$; second means for successively sampling all of said datum potentials on a linear time basis commencing with a datum potential corresponding to a second reference value of the variable $x$ different from said first given value and displaced from said first given value by more than one element of change in the value of the variable $x$; means for comparing the electrical information derived from said first and second sampling means for developing an indicating signal corresponding to said expected variation in said mathematical function; resettable time lapse indicating means responsive to the beginning of said sampling cycle to commence a time lapse measurement; means for re-setting said time lapse indicating means to a reference condition at the termination of said sampling cycle; and means responsive to said indicating signal for effectively reading said time lapse indicating means at the time said peak occurs whereby the reading of said time lapse indicating means bears a known relation to the value of the variable $x$ at which said expected variation occurs.

10. Apparatus for analyzing a mathematical function for determining given aspects thereof as a function of an independent variable, comprising in combination: a plurality of data presentation means arranged with respect to one another to permit their sequential successive sampling during a given sampling period, each of said data presentation means depicting in their order of physical arrangement and intended sampling, successive values of said mathematical function for given elemental changes in the value of said independent variable; first means for successively sampling all of said data presentation means in a given sampling time period to develop a first sampling output signal, said first sampling means commencing in its sampling action with a predetermined value of the mathematical function corresponding to a given discrete value of the independent variable; second means for successively sampling all of said data presentation means in a given sampling time period to develop a second sampling output signal, said second sampling means commencing with a different value of the mathematical function corresponding to a second given value of the independent variable displaced from said first given value by at least one elemental change in the value of the independent variable; and means for processing said first and second sampling output signals with one another during said sampling period to determine given aspects of said mathematical function.

11. Apparatus for examining a mathematical function $f(x)$ for determining the value of the variable $x$ at which an expected peak in the mathematical function occurs, the combination of: data collection and presentation means for providing at a plurality of output terminals, datum potentials representing the values of said function for successive equispaced elemental changes in a given direction of the variable $x$; first means for sequentially and successively sampling all of said datum potentials on a substantially linear time basis within a given sampling interval commencing with a datum potential corresponding to a given reference value of the variable $x$; second means for sequentially and successively sampling all of said datum potentials on a substantially linear time basis within said same given sampling interval commencing with a datum potential corresponding to a second reference value of the variable $x$ different from said first given value and displaced therefrom by more than one increment in value of the variable $x$; means for combining the information derived from said first and second sampling means for developing an alternating current indicator waveform signal having a zero crossing about its axis occurring during a time in said sampling interval at which those values of datum potentials are sampled which correspond to values of the variable $x$ defining said expected peak; and means responsive to said indicator waveform for developing a peak indicating output signal in response to the occurrence of said zero crossing whereby said peak indicating output signal corresponds in timing occurrence to the expected peak of said mathematical function during its examination by said apparatus.

12. Apparatus for electrically analyzing a mathematical function $f(x)$ for determining the value of the variable $x$ at which an expected peak in said mathematical function occurs, comprising in combination: means for developing a fixed number of datum signals, each datum signal representing the value of said function for a different number of changes in the value of the variable $x$ over a given range, said developing means presenting said datum signals in a display relationship permitting their successive sampling in a given reading time interval; first means for successively sampling during said reading interval a plurality of closely spaced datum potentials to produce a first read-out signal representing a continuous averaging of at least two datum potentials adjacent one another with respect to increments in the variable $x$ over the range of datum potentials; second means for successively sampling during said reading interval a plurality of closely spaced datum potentials to produce a second read-out signal representing a continuous averaging of at least two datum potentials adjacent one another with respect to increments in the variable $x$ over the range of datum potentials, said second sampling means being displaced from said first sampling means by a value of the variable $x$ greater than the sampling period embraced by each; and means for subtractively combining the electrical information derived from said first and second sampling means for developing an alternating current waveform signal whose zero crossing about its axis defines the expected peak in said mathematical function.

13. Apparatus for examining the characteristics of a mathematical function $f(x)$, comprising in combination: a plurality of data presentation means each representing a magnitude of data corresponding to a discrete value of the function $f(x)$ as determined by a different value of the variable $x$; means for sampling all of said data presentation means during a given sampling period to yield first and second substantially identical sampling output signals phase displaced from one another, with each at any given instant during said sampling period representing the sampling of different data presentation means; and means for comparing said first and second sampling output signals, during said sampling period, for determining a desired aspect of said mathematical function.

14. In an apparatus for analyzing signal data, the combination of: a plurality of signal presentation means capable of being sampled, each presenting a signal presentation corresponding to a discrete value of data; means for sampling all of said signal presentation means during a given sampling period to yield a sampling output signal; resettable time lapse measuring means responsive to said sampling means to commence time measurement at the beginning of said sampling period and reset at the end of said sampling period, said time lapse measuring means being capable of interrogation at any time during its time measurement action to yield time-measurement signal information representing the magnitude of time elapsed between the commencement of time measurement to the time at which said time-lapse measuring means is interrogated; and means responsive to said sampling signal for effectively interrogating said time lapse measuring for effectively interrogating said time lapse measuring means upon the sampling of predetermined data by said sampling means whereby the magnitude of time lapse depicted by said time-measurement signal information, at the instant of interrogation, identifies the particular presentation means presenting the data signal producing said interrogation.

15. In an electrical commutation system, the combination of: a plurality of signal presentation means designated for sequential commutation to a single commutation terminal all during a predetermined commutation time interval, such that the number of presentation means commutated during said commutation interval establishes a given ripple frequency component at said terminal; a time lapse measuring means capable of advancement and interrogation in response to electrical signals the interrogation of said time lapse measuring means yielding signal information representing the magnitude of time elapsed between the commencement of time measurement to the time at which said time lapse measuring means is interrogated; means coupled with said commutation means for deriving an electrical signal bearing a synchronous relation to said ripple component to advance said time lapse measuring means during the progression of said commutation cycle; and means responsive to said commutated signal for interrogating said time lapse measuring device during the progression of said commutation interval to identify the particular instant within said commutation interval at which a given change in commutated data occurs.

16. In an electrical signal correlation process system wherein two electrical signals are to be correlated to develop a plurality of correlation function values on the basis of elemental changes in relative correlation delay between said signals, all during a given total correlation period, the combination of: means for delivering to each of a plurality of output terminals a correlation datum potential corresponding to the value of the correlation function of said two signals for each incremental change in the correlation delay employed whereby said output terminals display electrical data depicting the character of a correlation process curve depicting said correlation signal process; means for effectively sampling all of said correlation data potentials during a given sampling interval which is smaller in time duration than said correlation interval to yield a first and second sampling output signals phase displaced with respect to one another with each at any given instant during said sampling period representing the sampling of different correlation data; and means for combining said first and second sampling output signals, throughout said sampling period, to develop an indicating signal representing a peak in the correlation process curve depicting said correlation signal process.

17. In a signal correlation apparatus wherein two electrical signals are correlated with respect to one another on an elemental time delay basis within a given total correlation time to develop a plurality of datum potentials representing a correlation curve having an expected peak for a given value of elemental time delay, the combination of: first means for successively sampling all of said correlation datum potentials at a constant rate during an interval less than said given total correlation time required to develop said correlation datum potentials; second means for successively sampling all of said correlation datum potentials at a constant rate during an interval less than said given total correlation time required to develop said correlation datum potentials, said second means being effectively time displaced in its sampling action from said first sampling means by at least the value of one elemental time change employed in said signal correlation; means for subtractively combining the output signals from said first and second sampling means to develop an indicating signal whose zero crossing about its axis substantially represents the expected peak of said correlation curve; and means responsive to said zero crossing for developing an indicating signal representing the particular value of elemental correlation time delay defining that range of said correlation curve in which said expected peak occurs.

18. In a data analyzing system, the combination of: means for scanning a plurality of electrical data during a given scanning interval to produce an output signal; means coupled with said scanning means for developing a reference signal which changes in character in a predetermined manner by a given amount during said scanning interval; and means responsive to a predetermined aspect of said output signal for sampling said reference signal during said scanning interval to produce an indicating signal which identifies the particular phase in said scanning interval at which said predetermined aspect of said output signal is developed.

References Cited in the file of this patent

UNITED STATES PATENTS

| | | |
|---|---|---|
| 2,517,805 | Spindler | Aug. 8, 1950 |
| 2,676,206 | Bennett | Apr. 20, 1954 |
| 2,927,656 | Feagin et al. | Mar. 8, 1960 |

OTHER REFERENCES

"Royal Aircraft Establishment Technical Note No. G.W. 225" (Major F. W. Stoneman and D. E. Verrian), published by the Secretary, Ministry of Supply (Millbank, London), 1952.

UNITED STATES PATENT OFFICE
CERTIFICATE OF CORRECTION

Patent No. 3,043,515                                 July 10, 1962

Neal S. Anderson et al.

It is hereby certified that error appears in the above numbered patent requiring correction and that the said Letters Patent should read as corrected below.

Column 2, line 10, after "amplitude" insert -- and --; column 4, line 39, for "Electsical" read -- Electrical --.

Signed and sealed this 30th day of October 1962.

(SEAL)
Attest:

ERNEST W. SWIDER
Attesting Officer

DAVID L. LADD
Commissioner of Patents